Aug. 26, 1952 D. A. SHARRY 2,608,221
SAW ATTACHMENT FOR MOTOR VEHICLES
Filed Feb. 4, 1946 2 SHEETS—SHEET 1
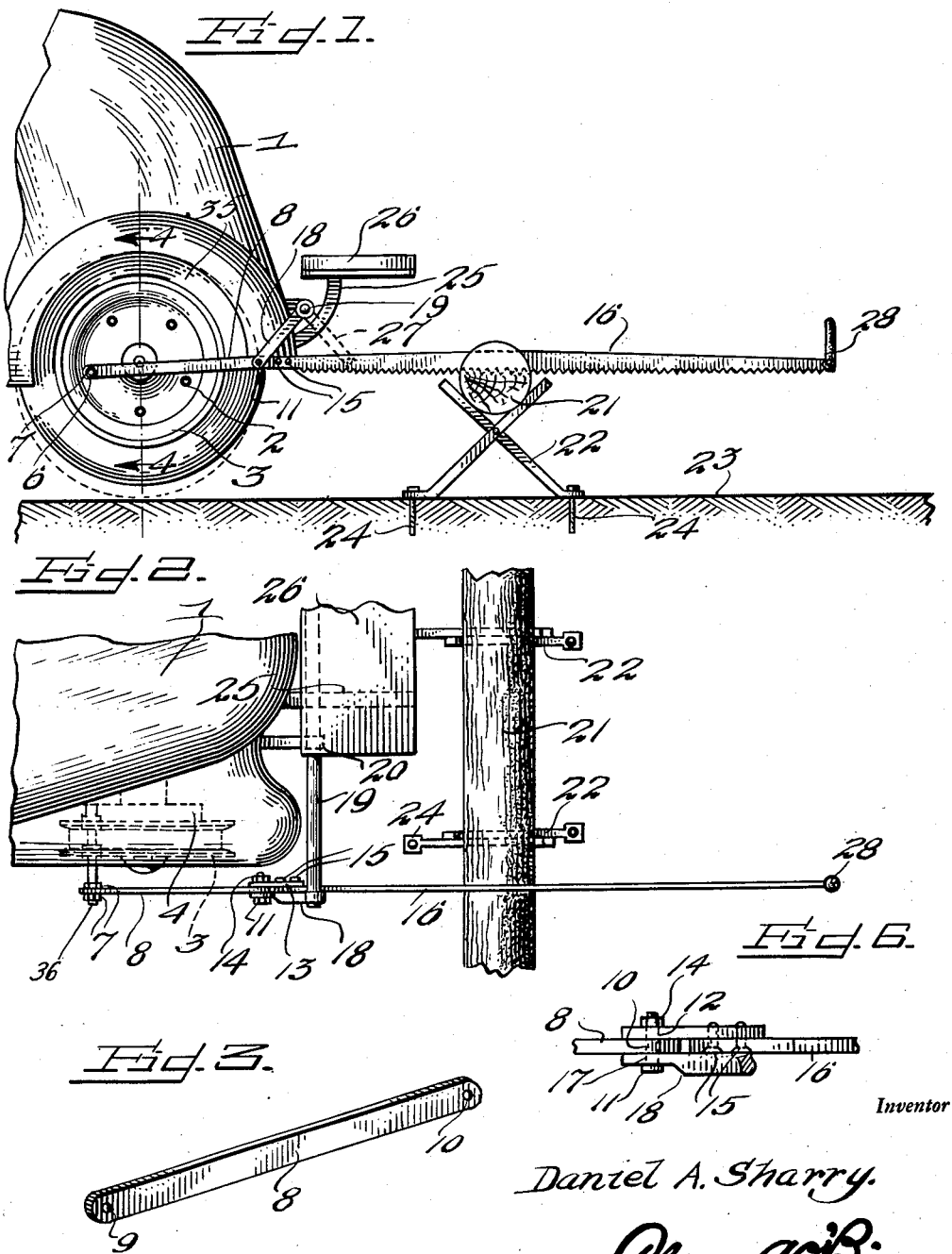
Inventor
Daniel A. Sharry.
By Clarence A. O'Brien
and Harvey B. Jacobson
Attorneys

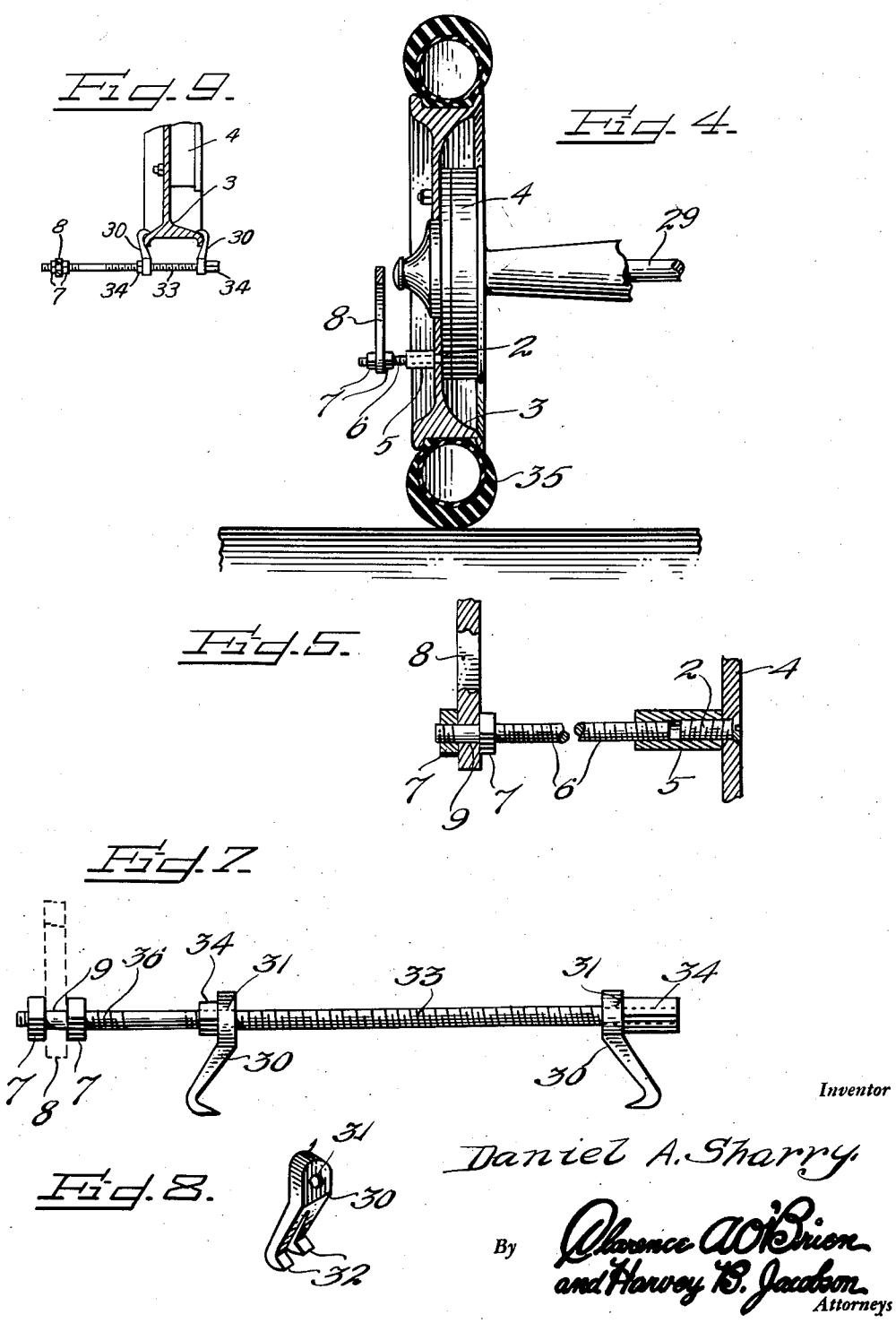

Patented Aug. 26, 1952

2,608,221

UNITED STATES PATENT OFFICE 2,608,221

SAW ATTACHMENT FOR MOTOR VEHICLES

Daniel A. Sharry, Detroit, Mich.

Application February 4, 1946, Serial No. 645,368

1 Claim. (Cl. 143—63)

This invention relates to new and useful improvements and structural refinements in saw attachments for motor vehicles, and the principal object of the invention is to provide a device of the character herein described in which a reciprocable saw is actuated by the rotation of one of the driving wheels of the vehicle.

A further object of the invention is to provide a saw attachment which may be quickly applied to, or easily removed from the vehicle with which it is used.

Another object of the invention is to provide a saw attachment which, by virtue of its association with the vehicle, may be conveniently transported to and from its sight of operation.

An additional object of the invention is to provide a saw attachment which is of simple construction and which will withstand the severe usage to which it is subjected.

With the above more important objects in view, and such other objects as may become apparent as this specification proceeds, the invention consists essentially of the arrangement and construction of parts as illustrated in the accompanying drawings, in which:

Figure 1 is a side elevation of the invention, showing the same in readiness for operation.

Figure 2 is a plan view of the subject matter illustrated in Figure 1, with the exception that the attachment means of Figure 7 is substituted for the attachment means shown in Figure 5.

Figure 3 is a perspective view of a connecting rod used in the invention.

Figure 4 is a cross sectional view taken in the plane of the line 4—4 in Figure 1.

Figure 5 is a cross sectional view illustrating the manner in which the connecting rod is attached to the wheel of the vehicle.

Figure 6 is a plan view showing the connection between the connecting rod and the saw.

Figure 7 is a side elevation illustrating a modified embodiment of the manner in which the connecting rod may be attached to the wheel.

Figure 8 is a perspective view of one of the clamps shown in Figure 7, and

Figure 9 is a fragmentary sectional view, showing the device of Figure 7 applied to the rim of a wheel.

Like characters of reference are used to designate like parts in the specification and throughout the several views.

Referring now to the accompanying drawings, particularly to Figures 1 and 4 thereof, the motor vehicle 1 to which the invention is to be attached is usually provided with a plurality of bolts 2, whereby the wheels 3 are secured to the brake drums 4.

The invention is attached to one of the driven wheels of the vehicle which is usually in the rear, and the attachment consists of an internally threaded coupling 5, one end of which is threaded onto one of the aforementioned bolts 2.

Threaded into the remaining end of the coupling 5 is an externally threaded stud 6 which, in turn, is provided at the free end thereof with a pair of lock nuts 7.

A connecting rod 8, formed with an aperture 9 in one of its ends, is freely rotatable on the stud 6 between the lock nuts 7. The remaining end of the rod 8 is provided with a further aperture 10 designed to receive a pivot bolt 11, the latter being threaded into a threaded aperture 12 formed in an extension bracket 13, the bolt 11 being secured in position by means of a lock nut 14 bearing against the side of the bracket.

The bracket 13 is secured by means of a pair of bolts 15 to one end of the saw 16, and in addition to the arm 8 and the bracket 13, the bolt 11 also passes through an aperture 17 formed in one end of a rocker arm 18. The remaining end of this arm is secured to one end of a transversely extending shaft 19, the latter being rotatably journaled in a pair of trunnions 20 secured to the body of the vehicle 1.

The log 21, which is to be sawn, is positioned in a conventional horse 22 which may be firmly secured to the ground 23 by means of suitable anchor bolts 24.

The body of the vehicle 1 is also provided with a pair of supports 25 on which is mounted a work bench 26 for the convenience of the operator.

When the invention is placed in operation, the wheel 3 is jacked up from the ground in order to facilitate free rotation thereof, as is best illustrated in the accompanying Figure 1.

The rotation of the wheel will impart through the connecting rod 3, a reciprocating motion to the saw 16 and the rocker arm 18 will swing from the position indicated by the full line in Figure 1 to that designated by the phantom lines 27. In this manner, the movement of the arm 8 and of the saw 16 will be effectively guided and, if desired, the remaining end of the saw may be steadied by holding the conventional handle 28.

It will be noted that in the foregoing embodiment of the invention, the stroke of the saw is limited by the diametrical pitch of the bolts 2 with respect to the axle 29. If it is desired to increase the stroke of the saw beyond the aforementioned limits, the modified embodiment of the invention illustrated in the accompanying Figures 7 and 8 may be employed in substitution for the coupling 5 and the stud 6.

The modified embodiment consists of a pair of clamps 30, each provided with an aperture 31 and a pair of pointed fingers 32. The clamps 30 are positioned upon a screw threaded pin 33 which also carries a pair of lock nuts 34.

When this embodiment of the invention is placed in operation, the tire 35 is removed from the wheel 3 and the pin 33 is placed against the periphery of the wheel. By tightening the nuts 34 the fingers 32 will be pressed against the side rims of the wheel and the pin will be thus held firmly in position.

The projecting end 36 of the pin 33 extends beyond the outer face of the wheel 3 and the connecting rod 8 is rotatably positioned on the pin in a manner which has been already described in connection with the aforementioned stud 6.

While in the foregoing there has been shown and described the preferred embodiment of this invention it is to be understood that minor changes in the details of construction, combination, and arrangement of parts may be resorted to without departing from the spirit and scope of the invention as claimed.

What I claim as my invention is:

In association with a motor vehicle body and drive wheels, one of said wheels being out of contact with the surface supporting the vehicle, a saw attachment comprising, in combination, a pair of clamp jaws each formed with an aperture at one end thereof, a pair of pointed fingers at the remaining end of each of said clamp jaws, a screw threaded pin passing through said apertures, a pair of lock nuts on said pin, said clamp jaws being positioned on the side rims of one of the drive wheels of said vehicle adjacent the periphery thereof, said nuts urging said clamps together, said fingers bearing against said rims, said pin extending transversely projecting beyond the outer face of said wheel, a connecting rod rotatably positioned on the projecting end of said pin, a further pair of lock nuts threaded on said pin and retaining said rod on said pin, a reciprocable saw, an extension bracket secured to one end of said saw, a pivot bolt, and a rocker arm, said bolt pivotally connecting the end of said rod and one end of said arm to said bracket, a pair of trunnions on the body of the vehicle, and a transversely extending shaft rotatably journalled in said trunnions, the remaining end of said arm being secured to said shaft.

DANIEL A. SHARRY.

REFERENCES CITED

The following references are of record in the file of this patent:

UNITED STATES PATENTS

| Number | Name | Date |
|---|---|---|
| 334,297 | Smith | Jan. 12, 1886 |
| 1,353,786 | Roberts | Sept. 21, 1920 |
| 1,498,107 | Montgomery | June 17, 1924 |
| 1,617,017 | Dudley | Feb. 8, 1927 |
| 1,993,797 | Peterson | Mar. 12, 1935 |
| 2,002,179 | Hitchcock | Mar. 21, 1935 |
| 2,233,114 | Sowell | Feb. 25, 1941 |

FOREIGN PATENTS

| Number | Country | Date |
|---|---|---|
| 417,476 | France | July 8, 1911 |